United States Patent [19]

Fulukawa

[11] 3,962,089

[45] June 8, 1976

[54] APPARATUS FOR SOFTENING HARD WATER

[75] Inventor: Yoshisada Fulukawa, Tokyo, Japan

[73] Assignee: Maruyama Mfg. Co., Ltd., Tokyo, Japan

[22] Filed: Aug. 21, 1974

[21] Appl. No.: 499,330

[30] Foreign Application Priority Data

Sept. 26, 1973  Japan.............................. 48-108208

[52] U.S. Cl................................ 210/191; 210/278
[51] Int. Cl.²......................................... B01D 29/38
[58] Field of Search.................... 210/278, 424–426, 210/190, 191

[56] References Cited

UNITED STATES PATENTS

| | | | |
|---|---|---|---|
| 2,610,945 | 9/1952 | Purcell et al..................... | 210/278 X |
| 3,233,732 | 2/1966 | Lung et al....................... | 210/278 X |
| 3,278,424 | 10/1966 | Griswold......................... | 210/278 X |
| 3,616,820 | 11/1971 | Fleckenstein.................... | 210/278 X |

*Primary Examiner*—John Adee
*Attorney, Agent, or Firm*—Woodhams, Blanchard and Flynn

[57] ABSTRACT

An apparatus for softening hard water, wherein a raw water pipe, a soft water pipe, a discharge pipe and a salt water pipe are connected with a cylindrical valve seat equipped on a softening tank accommodating ion-exchange resin to open into said tank, a rotary valve whose center hole slidingly fits on the upper end of a water pipe erected through the layer of said ion-exchange resin is rotatably installed in said cylindrical valve seat, said rotary valve is provided with a passage through which said raw water pipe, soft water pipe and discharge pipe can be separately connected with said salt water pipe and a passage through which said raw water pipe, discharge pipe and salt water pipe can be separately connected with said softening tank without recoursing to said water pipe, and through the rotation of sai rotary valve the combinations of (a) raw water pipe and soft water pipe, (b) raw water pipe and discharge pipe and (c) salt water pipe and discharge pipe can be alternately connected with the softening tank, whereby the softening of the raw water, washing of the ion-exchange resin and activation of the ion-exchange resin are alternately effected.

6 Claims, 22 Drawing Figures

FIG. 10

# APPARATUS FOR SOFTENING HARD WATER

BACKGROUND OF THE INVENTION 1. a. Field of the Invention

The present invention relates to an apparatus for use in softening hard water, and it particularly relates to an apparatus for softening hard water which is opposite to the case of softening the raw water supplied from service pipes so as to be fit for use in boilers.

2. b. Description of the prior Art

As water for use in boilers, the raw water supplied from service pipes has hitherto been generally employed. However, such raw water has usually a high hardness and is rich in scale-forming ingredients, so that it must be treated for softening. And, to meet this requirement, there have been proposed various apparatuses for softening hard water utilizing ion-exchange resins.

The ion-exchange resin to serve for this purpose is of $Na^+$ type, and the softening of raw water is supposed to be performed by exchanging metal cation, such as $Ca^{2+}$ or $Mg^{2+}$, contained in said raw water for $Na^+$. But, with the progress of this softening operation to a certain degree, the ion-exchange resin gets saturated and loses its softening capacity, so that it becomes necessary to suspend the supply of raw water and to supply salt water in place of raw water to thereby activate ion-exchange resin.

Under such circumstances, there have hitherto been proposed various apparatuses for softening hard water so devised as to be capable of performing the softening operation and the ion-exchange resin activation operation concurrently, and these apparatuses can be classified into two types, one type wherein the valve installed in the softening zone is separate from the valve installed in the activation zone and the other wherein these two valves are consolidated into single valve.

However, all of these conventional apparatuses have a drawback that, inasmuch as they are of such construction as requiring direct operation of the valve or valves by the operator and synchronization of said operation with the cycle of activation of ion-exchange resin, they can be handled only by those having thorough knowledge of the construction of said apparatuses as well as how to operate them.

SUMMARY OF THE INVENTION

Principal object of the present invention is to provide an apparatus for softening hard water, which is capable of overcoming the above discussed defects of the conventional apparatuses for softening hard water.

Another object of the present invention is to provide an apparatus for softening hard water, wherein: a raw water pipe, a soft water pipe, a discharge pipe and a salt water pipe are connected with a cylindrical valve seat equipped on a softening tank accommodating the layer of ion-exchange resin to open into said tank; a rotary valve is rotatably installed in said cylindrical valve seat, said rotary valve being provided with a passage through which said raw water pipe, soft water pipe and discharge pipe can be separately connected with a water pipe erected through said ion-exchange resin layer and a passage through which said raw water pipe, discharge pipe and salt water pipe can be separately connected with said softening tank without recoursing to said water pipe; through the rotation of said rotary valve, the combinations of (a) raw water pipe and soft water pipe, (b) raw water pipe and discharge pipe and (c) salt water pipe and discharge pipe can be alternately connected with the softening tank; through the selective connection of said combinations of pipe (a), (b) and (c) with the softening tank, the softening of the raw water, washing of the ion-exchange resin and activation of the ion-exchange resin can be alternately effected; and through the mere rotation of the rotary valve, the switchover of the foregoing processes can be readily performed.

A further object of the present invention is to provide an apparatus for softening hard water, which is so devised that said rotary valve can be rotated by a motor, and said motor can be automatically controlled by means of various controlling elements equipped on the controlling circuit thereof, whereby the operation of softening raw water can be performed efficiently without requiring any skilled personnel.

A still further object of the present invention is to provide an apparatus for softening hard water, wherein said controlling circuit is provided with a floating switch installed in said softening tank, so that, when the water level in the softening tank descends below a predetermined level, said floating switch works to rotate the motor and automatically displace the rotary valve from the position for stopping the operation of the apparatus to the position for softening, and as a result, there is no fear of overflow of the softening tank to be caused by excessive supply of soft water, and a fixed amount of soft water necessary for the operation can be always secured.

Still another object of the present invention is to provide an apparatus for softening hard water, wherein a limit time for softening capacity of ion-exchange resin is set in said controlling circuit and also a timer to count the softening operation hours is disposed therein, so that, when said limit time agrees with said softening operation hours, the timer works to actuate the motor and the rotary valve is displaced from the position for softening to a different position, whereby it can be ensured that the raw water be supplied only when the ion-exchange resin holds softening capacity and the softening operation can be reliably performed.

DETAILED DESCRIPTION OF THE INVENTION

Figure 1:
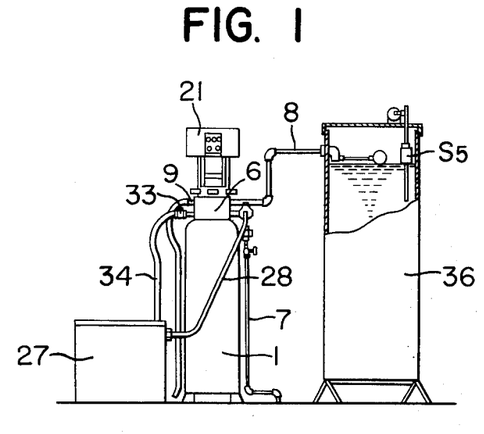
FIG. 1 is a general front view — a partically cut off — of an apparatus for softening hard water embodying the present invention.
Figure 2:
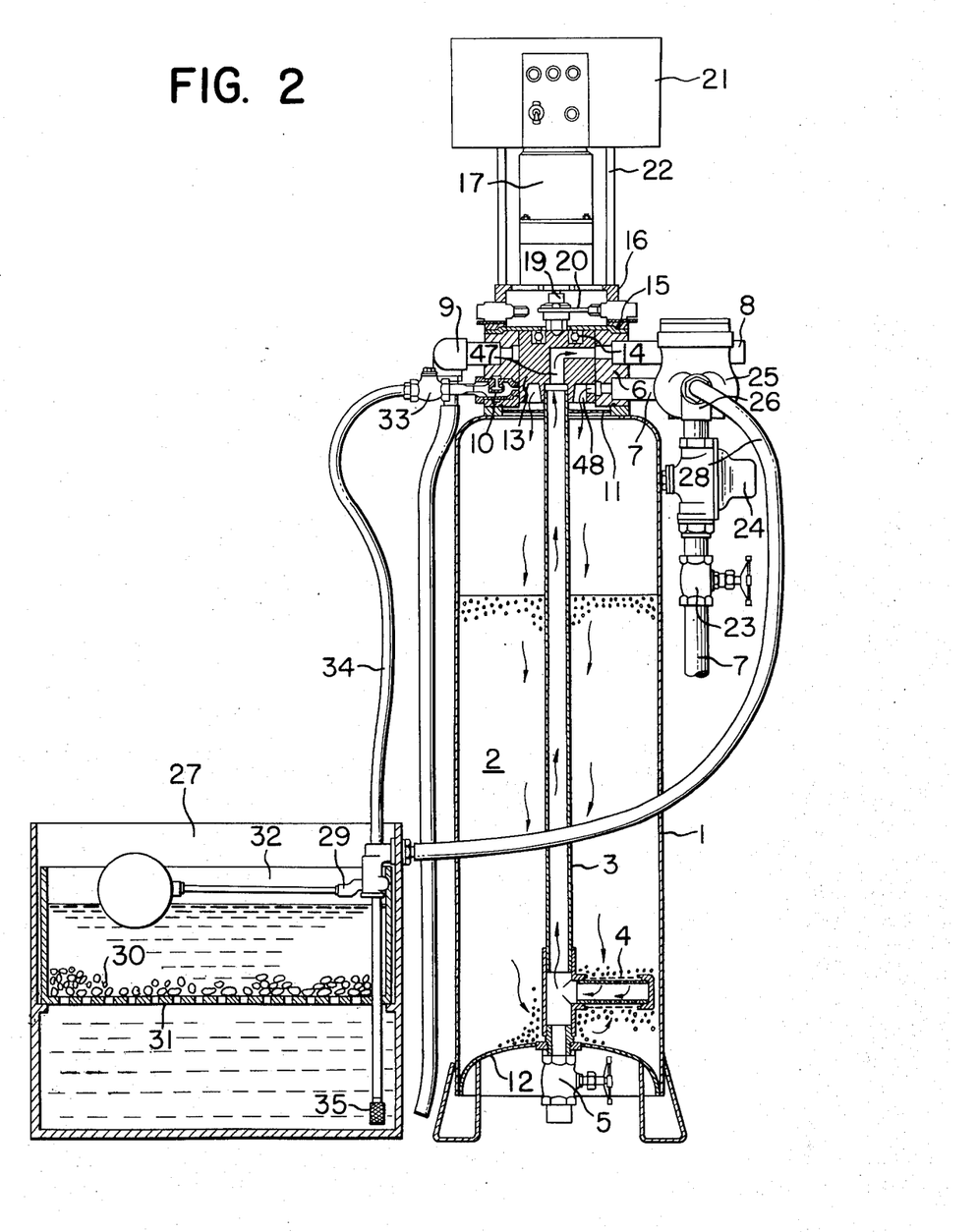
FIG. 2 is a vertical section — on an enlarged scale — of a part of the apparatus shown in FIG. 1, which is illustrative of the softening tank, salt water tank and motor controlling board.

Referring to FIG. 1, the reference numeral 1 denotes the softening tank whose upper end is provided with the cylindrical valve seat 6, and the raw water pipe 7 and soft water pipe 8 are respectively connected with one side of said cylindrical valve seat 6 to open into it while the discharge pipe 9 and salt water pipe 34 are respectively connected with the opposite side of said valve seat to open into it. The other end of the raw water pipe 7 is connected with an underground aqueduct not shown in the drawing, and the upper part of said pipe 7 is connected with the upper end of the hose 28, while the lower end of said hose 28 opens into the salt water tank 27. The other end of the soft water pipe 8 opens into the soft water tank 36, and the upper part of said tank 36 is equipped with the floating switch S5. The other end of the salt water pipe 34 opens into the salt water tank 27:

FIG. 2 illustrates the internal construction — on an enlarged scale — of the softening tank 1 and the salt water tank 27 shown in FIG. 1.

In this FIG. 2, the reference numeral 3 denotes the water pipe erected in the center of the bottom wall 12 of the softening tank 1, and the upper part of said water pipe 3 penetrates the filter 11 covering the upper opening of the softening tank 1 to extend upward while the lower part of the same is provided with the filter pipe 4 branching therefrom. The part of the water pipe 3 projecting from the bottom wall 12 of the softening tank 1 is fixed to the drain valve 5. The surroundings of the water pipe 3 and the filter pipe 4 are packed with the ion-exchange resin 2.

The upper opening of the softening tank 1 is provided with the cylindrical sleevelike valve seat 6 as stated above, and as illustrated in FIGS. 3A–8C, the horizontal holes 38 and 39 are vertically aligned on one side of said valve seat 6 while the horizontal holes 40 and 41 are also vertically aligned on the diametrically opposite sides of said valve seat 6. Further, the arcuate grooves 42 and 43 are connected with the horizontal holes 39 and 40, respectively, are cut along the inner wall of the valve seat 6 within the sphere of about 120°C in terms of the angle at the center, and the confronting ends of these grooves 42 and 43 are provided with the vertical holes 44 and 45 having a length equivalent to the distance between the horizontal holes 38 and 39 and the distance between the horizontal holes 40 and 41, respectively. The upper end of the vertical hole 44 is connected with the inside and outside of the valve seat 6 through the horizontal hole 51, and the outside opening of said hole 51 is provided with the purge cock 37 which is to be opened at the time of purging water from the softening tank 1. The lower end of the vertical hole 45 is connected with the inside of the valve seat 6.

The horizontal holes 38 and 39 are respectively fitted on the soft water pipe 8 and the raw water pipe 7, and the horizontal hole 41 is fitted on the ejector 10, said ejector being connected with the salt water pipe 34 through the check valve 33. Further, the ejector 10 and one end of the arcuate groove 42 are interconnected through the horizontal hole 46.

The rotary valve 13 slidingly fits in the valve seat 6, and the center of said rotary valve 13 is provided with the vertical hole 47. The elevation of the upper end of said vertical hole 47 is equivalent to the elevation of the horizontal hole 38, and this end is connected with the horizontal hole 48 whose fore end opens into the wall of the valve seat 6. The lower end of the vertical hole 47 fits water-tightly and slidingly in the upper end of the water pipe 3. The lower part of the rotary valve 13 is provided with the circular groove 49 as cut to encircle the verticle hole 47 at a distance therefrom. The elevation of the upper end of said circular groove 49 is equivalent to the elevation of the horizontal hole 39, and the horizontal hole 50 is disposed at an angle such that, when the horizontal hole 48 comes to be connected with the horizontal hole 38, the vertical hole 44 comes to be connected with the horizontal hole 39. The fore end of said horizontal hole 50 opens into the wall of the valve (See FIG. 4B and 4C).

The top of the rotary valve 13 is covered with the valve cover 15 fixed to the valve seat 6, and the bearing 14 is interposed between the rotary valve 13 and the valve cover 15, whereby the rotary valve 13 can be rotated by the driving shaft 19 connected with the reduction reversible motor 17.

Figure 9:
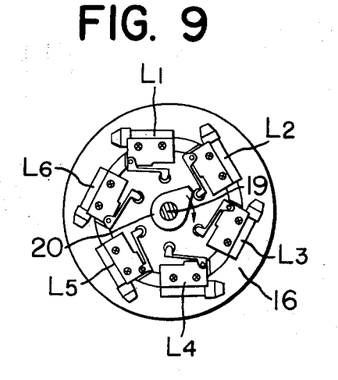
FIG. 9 is a cross section of the switch box in FIG. 2.

The motor 17 is supported by the switch box 16 fixed on the valve cover 15. In the switch box 16, there are radially arranged in the limit switches L1–L6 as shown in FIG. 9, and said limit switches L1–L6 are to be actuated by the cam 20 fixed to the driving shaft 19.

21 denotes the controlling board accommodating various meters and circuits for the purpose of controlling the present apparatus, and it is installed above the motor 17 by means of the stay 22.

The raw water pipe 7 is equipped with the reducing valve 24, integrating flow meter 25 and cheese pipe 26. The cheese pipe 26 is connected with the hose 28 extending to the salt water tank 27, and the end of said hose 28 opening into the salt water tank 27 is equipped with the ball tap 29.

The salt water tank 27 is provided with the salt box 32 to accommodate the salt 30 therein, the bottom of said box consisting of the filter 31. The lower end of the salt water pipe 34 inserted in the salt water tank 27 is equipped with the filter 35.

Figure 10:
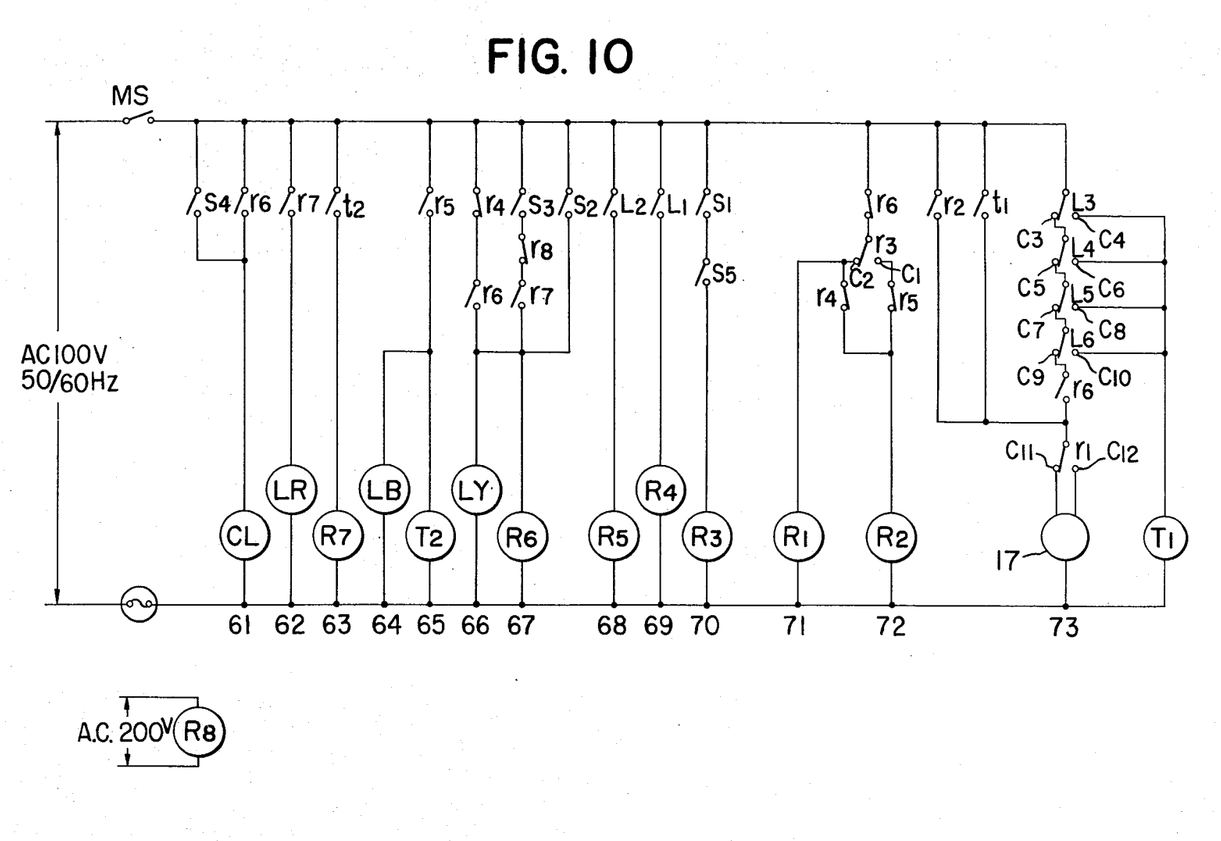
FIG. 10 is a diagrammatic representation of the controlling circuit of the apparatus shown in FIG. 1.

The controlling electric circuit of the present apparatus is illustrated in FIG. 10, and a major portion thereof is incorporated into the controlling board 21.

In FIG. 10, MS represents the main switch, S1–S4 represent the hand switch respectively, S5 represents the floating switch, T1 and T2 represent the timer respectively, $t1$ and $t2$ represent the switch to be actuated by the timer T1 and T2 respectively, CL represents the clutch of the timer T2, R1–R8 represent the relay respectively, $r1$–$r8$ represent the switch to be actuated by the relay R1–R8 respectively, $c1$–$c14$ represent the contact respectively, and LR, LB and LY represent the red, the blue and the yellow signal lamp respectively.

Hereunder will be explained the state of working of the foregoing apparatus by reference to from FIG. 3 onward.

1. State of apparatus in abeyance

Figure 3A:
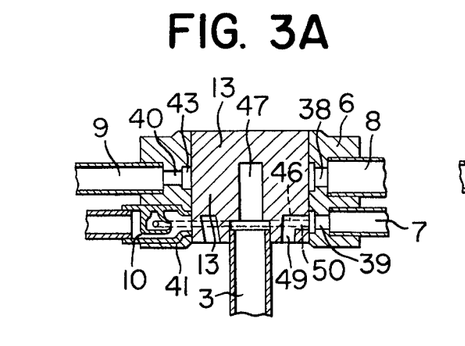
FIGS. 3A–C are views of a vertical section as well as cross sections as cut along various horizontal levels — on an enlarged scale — of the valve member of the apparatus shown in FIG. 2, as taken at the time of suspension of the softening operation.
Figure 3B:
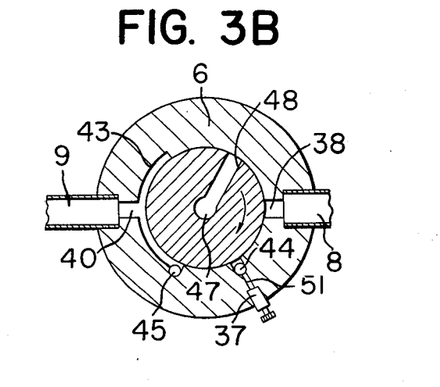
Figures 3C, 4C:
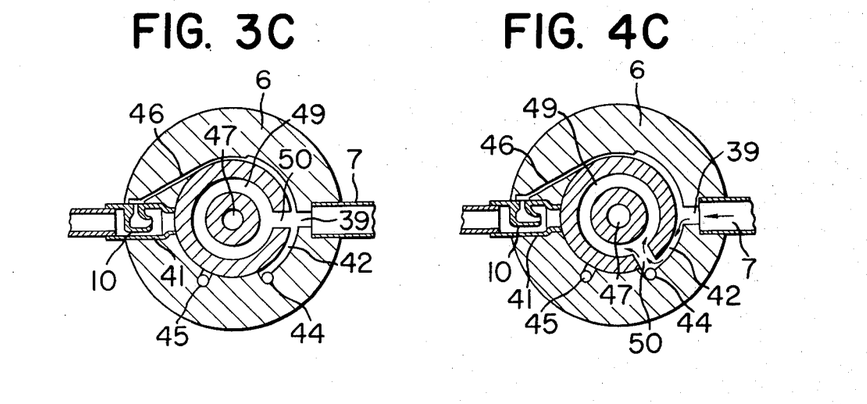
FIGS. 4A–C are views of a vertical section as well as cross sections of the same valve member as above, as taken at the time of the softening process.

When the apparatus is out of operation, the rotary valve 13 is in such a position as illustrated by FIGS. 3A, B and C, and even when the raw water is fed to the tank 1 through the raw water pipe 7, water stored in the tank 1 never flows out of said tank 1.

In other words, though the raw water pipe 7 is connected with the tank 1 through the horizontal holes 39 and 50 and the circular groove 49, the horizontal hole 48 connected with the water 3 is sealed by means of the inner wall of the valve seat 6.

On this occasion, the cam 20 equipped on the driving shaft 19 of the motor 17 pushes the limit switch L1 to close it. Accordingly, in FIG. 10, even when the main switch MS is closed and the relay R4 is excited, the normal close-switch $r4$ opens and the relay R2 is demagnetized, so that the switch $r2$ of the line 73 is not closed and accordingly the motor 17 does not rotate, whereby the state of the apparatus being out of operation continues.

2 Softening process

In this process, the raw water is supplied to the resin 2 within the softening tank 1 through the raw water pipe 7, and while making said raw water descend through the resin 2, the hardness of the raw water is eliminated. And the thus softened water is discharged into the soft water tank 36 through the soft water pipe 8.

In order to actuate the apparatus for softening hard water which is out of operation as set forth above and to start the softening process, the switch S1 is supposed to be closed by the operator when the softened water has been supplied from the softening tank 36 to the boiler (which is not shown in the drawing), causing the water level to descend, and the floating switch S5 of the line 70 has been closed. Referring to FIG. 10, when the relay R3 is excited by closing the switch S1 as above, the switch $r3$ is made to connect with the contact $c1$, whereby the relay R1 of the line 71 is demagnetized and the relay R2 of the line 72 is excited.

As a result of demagnetization of the relay R1, the switch $r1$ of the line 73 contacts with the contact $c11$, and by demagnetization of the relay R2 the switch $r2$ of the same line is closed, whereby the motor 17 is rotated in the normal direction.

By virtue of this rotation of motor 17, the cam 20 parts from the limit switch L1 and turns clockwise in FIG. 9 to push the limit switch L2 and close it.

As a result, the relay R5 of the line 68 is excited to open the switch $r5$ of the line 72, and the relay R2 is excited to open the switch $r2$, whereby the rotation of the motor 17 is stopped. And at the same time, the switch $r5$ for the lines 64 and 65 is closed to light the blue lamp LB indicating that the softening process is on, and further the timer T2 is actuated to start counting the softening operation hours.

In this timer T2, the limit time for the softening capacity of ion-exchange resin 2 is set in advance. This limit time is determined on the basis of the amount of ion-exchange resin 2 and the hardness as well as the flow rate of raw water. For instance, when a raw water having the hardness of 2.5 DH (i.e., German Hardness) is let flow through the softening tank 1 packed with 15l of ion-exchange resin 2 at the flow rate of 1.0 m³/h, the limit time is calculated to be 15 hours. Accordingly, in case of softening said raw water under the foregoing conditions, the limit time of 15 hours is set in the timer T2.

Figure 4A:
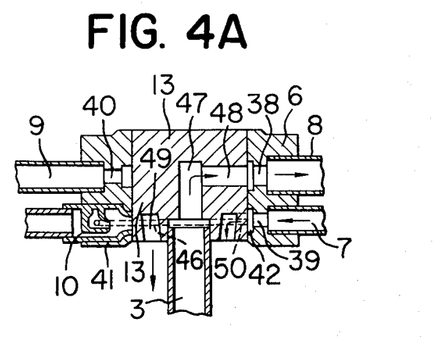
Figure 4B:
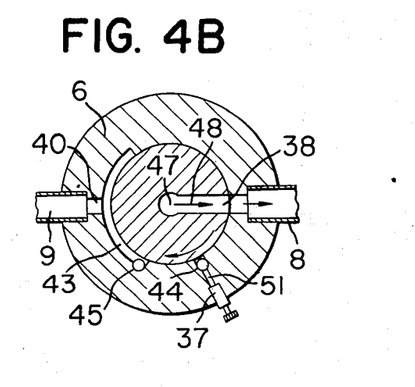

The position of the rotary valve 13 in this softening process is as illustrated in FIGS. 4A, B and C. On this occasion, the raw water pipe 7 is connected with the softening tank 1 through the horizontal hole 39, arcuate groove 42, horizontal hole 50 and circular groove 49, and the vertical hole 47 and horizontal hole 48 are connected with the soft water pipe 8 through the horizontal hole 38.

Accordingly, the raw water supplied through the raw water pipe 7 is poured on the ion-exchange resin 2 within the softening tank 1 from the circular groove 49 of the rotary valve 13 through the filter 11 in FIG. 2, whereby its hardness is removed. Subsequently, the resulting soft water enters the water pipe 3 through the filter pipe 4 and is sent in the soft water tank 36 to be stored therein through the vertical hole 47 of the rotary valve 13 and the soft water pipe 8.

When the switch S3 of the line 67 is in the state of being closed on the occasion of performing the foregoing softening process, the moment the softening time integrated by the timer T2 attains the limit time set in said timer T2 the timer T2 is actuated to close the switch $t2$ of the line 6 and the relay R7 is excited.

As a result of this excitation of the relay R7, the switch $r7$ of the line 6 is closed to light the red lamp LR indicating that the activiation process is on, and at the same time, the switch $r7$ of the line 67 is closed to excite the relay R6.

By this excitation of the relay R6, the switch $r6$ of the lines 61 and 73 is closed, the clutch CL is excited to restore the timer T2 to its former condition, and at the same time, the motor 17 is rotated in the normal direction, whereby the cam 20 parts from the limit switch L2 and pushes the limit switch L3 so as to disconnect it from the contact $c3$ and connect the same with the contact $c4$ instead.

In the foregoing case, if the pressure of the source of raw water supply is improperly high, it may be adjusted to be proper by means of the reducing valve 24 provided for the raw water pipe 7, which valve also works to prevent backward flow of the raw water. The integrating flow meter 25 computes the quantity of water passing it, or the quantity of water being discharged as soft water.

3. Washing process

In this process, the raw water is supplied to the resin 2 within the tank 1 through the water pipe 3, or contrariwise compared with the softening process. This process is for the purpose of making the raw water ascend through the resin 2 and then discharging it to the outside of the tank 1, whereby dissociating the layer of resin 2, discharging dust and pulverized resin to the outside of the tank 1 and renovating the softening reaction.

At the termination of the preceding softening process (2), the limit switch L3 is connected with the contact $c4$ to actuate the timer T1 as stated above, and consequently this washing process comes to start.

Figure 5A:
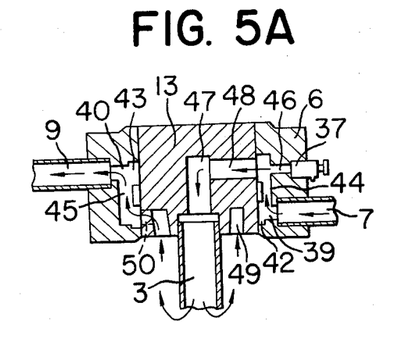
FIGS. 5A–C are views of a vertical section as well as cross sections of the same valve member as above, as taken at the time of the washing process.
Figure 5B:
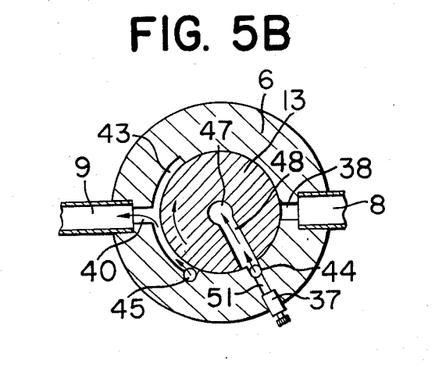
Figure 5C:
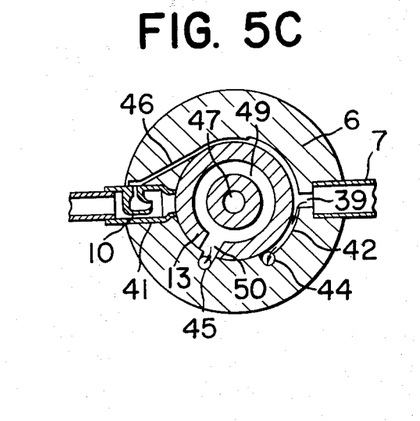

The position of the rotary valve 13 at this time is as illustrated in FIGS. 5A, B and C. That is, the raw water pipe 7 is connected with the water pipe 3 through the horizontal hole 39, arcuate groove 42, vertical hole 44, horizontal hole 48 and vertical hole 47, and the circular groove 49 is connected with the discharge pipe 9 through the horizontal hole 50, vertical hole 45, arcuate groove 43 and horizontal hole 40.

Accordingly, the raw water supplied from the raw water pipe 7 passes the vertical hole 47 and the water pipe 3 and is released in the lower part of the layer of resin 2 to flow upward through said resin 2. At the time of its passing the filter 11, passage of resin particles admixed therein is checked and the raw water alone is discharged to the outside of the tank 1 through the circular groove 49 of the rotary valve 13 and the discharge pipe 9. In this way, the raw water acts to wash the resin 2 while ascending therethrough.

When the foregoing washing process has continued for the period of time set in the timer T1, said timer T1 work to close the switch $t1$ of the line 73, the motor 17 is thereby rotated in the normal direction. At this, the cam 20 parts from the limit switch L3 to restore the timer T1 to its former condition and thereafter pushes the limit switch L4 so as to disconnect it from the contact $c5$ and connect the same with the contact $c6$ instead, whereby the motor 17 is stopped and simultaneously the timer T1 is actuated.

4. Activation process

In this process, the salt water in place of the raw water is supplied to the resin 2 within the tank 1 — which resin has performed the softening work to the utmost limit of its softening capacity — from the salt water tank 27 through the salt water pipe 34, the resin 2 is activated by removing the water-hardening substances attached thereto by virtue of the flow of said salt water, and thereafter the used salt water is discharged to the outside of the tank 1.

At the termination of the preceding washing process (3), the limit switch L4 is connected with the contact $c6$ to actuate the timer T1 as stated above, and consequently this activation process comes to start.

Figure 6A:
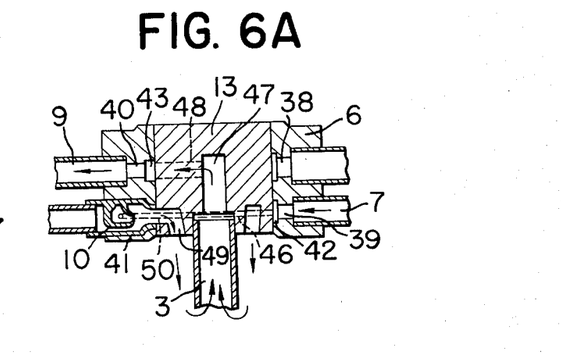
FIGS. 6A–C are views of a vertical section as well as cross sections of the same valve member as above, as taken at the time of the activation process.
Figure 6B:
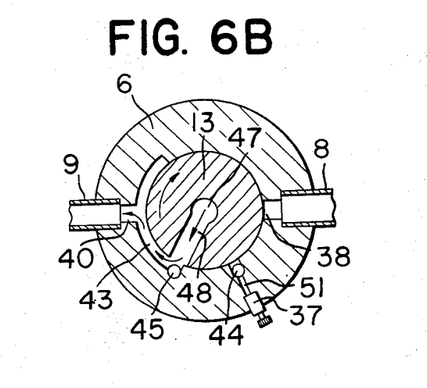
Figure 6C:
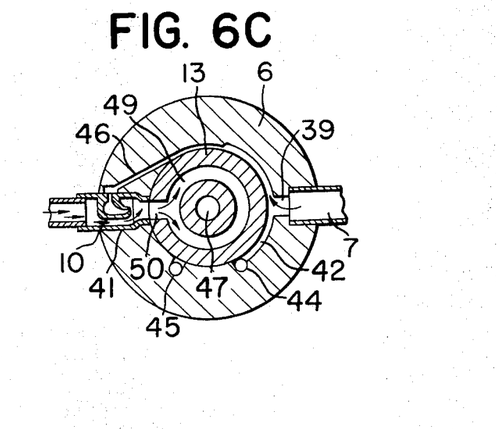

The position of the rotary valve 13 at this time is as illustrated in FIGS. 6A, B and C. That is, the raw water pipe 7 is connected with the inside of the tank 1 through the horizontal hole 39, arcuate groove 42, horizontal small hole 46, ejector 10, horizontal hole 50 and circular groove 49, and the inside of the tank 1 is further connected with the discharge pipe 9 through the vertical hole 47, horizontal hole 48, arcuate groove 43 and horizontal hole 40.

Accordingly, the raw water supplied from the raw water pipe 7 is jetted into the circular groove 49 through the nozzle of the ejector 10, and by vertue of the negative pressure brought on by this jet, the salt water stored in the salt water tank 27 is sucked up through the salt water pipe 34 to be supplied to the tank 1 together with the raw water jetted as above, activates the resin 2 within the tank 1 as it passes through the layer thereof, thereafter enters the water pipe 3 through the filter pipe 4, ascends along said water pipe 3, passes through the vertical hole 47, horizontal hole 48 and horizontal hole 40, and is discharged to the outside of the tank 1 through the discharge pipe 9.

In this case, by virtue of the check valve 33 provided for the salt water pipe 34, the salt water is supposed to be sucked up only when the suction is effected by the ejector 10, and the supply of the raw water to the salt water tank 27 due to the pressure on the part of raw water can be checked.

Further, as the raw material is to be supplied to the salt water tank 27 from the raw water pipe 7 through the cheese pipe 26 and hose 28, and said hose 28 is equipped with the ball tap 29, water supply from the hose 28 is discontinued whenever the water level in the salt water tank 27 attains a predetermined level, while in case where said water level descends below said predetermined level, the hose 28 automatically opens to effect water supply, whereby the tank 27 can always hold a fixed quantity of water.

When the foregoing activation process has continued for the period of time set in the timer T1, said timer T1 works in the same way as in the preceding washing process (3), so that the cam 20 parts from the limit switch L4 to restore the timer T1 to its former condition and thereafter pushes the limit switch L5 so as to disconnect it from the contact $c7$ and connect the same with the contact $c8$ instead, whereby the motor 17 is stopped and simultaneously the timer T1 is actuated.

5. Ejection process

This process succeeds the activation process (4). In this process, the salt water in the softening tank 1 is slowly pushed out by supplying a small quantity of raw water to said tank 1, thereby making the activation reaction therein last long.

At the termination of the preceding activation process (4), the limit switch L5 is connected with the contact $c8$ to actuate the timer T1 as stated above, and consequently this ejection process comes to start.

Figure 7A:
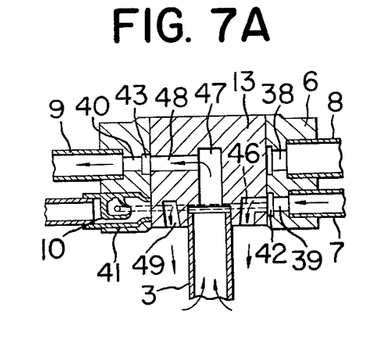
FIGS. 7A–C are views of a vertical section as well as cross sections of the same valve member as above, as taken at the time of the ejection process.
Figure 7B:
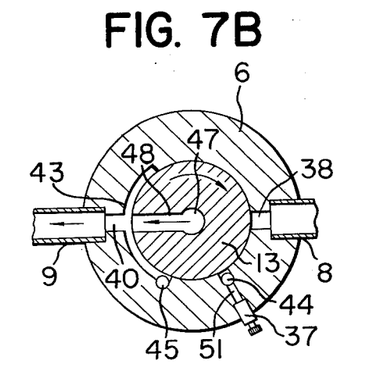
Figure 7C:
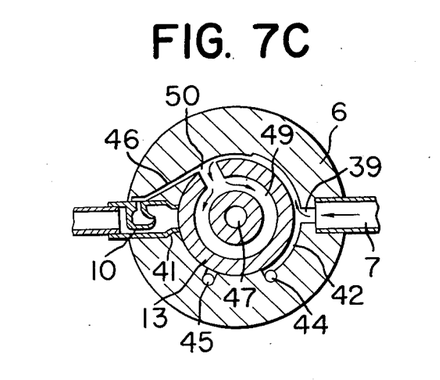

The position of the rotary valve 13 at this time is as illustrated in FIGS. 7A, B and C. That is, the raw water pipe 7 is connected with the inside of the tank 1 through the horizontal hole 39, arcuate groove 42, horizontal small hole 46, horizontal hole 50 and circular groove 49, and the inside of the tank 1 is further connected with the discharge pipe 9 through the vertical hole 47, horizontal hole 48 and horizontal hole 40.

Accordingly, the raw water sent in from the raw water pipe 7 is supplied little by little from the circular groove 49 to the tank 1 through the horizontal small hole 46, whereby the salt water present in the layer of resin 2 within said tank 1 is slowly driven out into the water pipe 3, ascends along said water pipe 3, passes through the vertical hole 47 and horizontal hole 40, and is discharged to the outside of the tank 1 through the discharge pipe 9.

When the foregoing ejection process has continued for the period of time set in the timer T1, said timer T1 works in the same way as in the preceding activation process (4), so that the cam 20 parts from the limit switch L5 to restore the timer T1 to its former condition and thereafter pushes the limit switch L6 so as to disconnect it from the contact $c9$ and connect the same with the contact 10 instead, whereby the motor 17 is stopped and simultaneously the timer T1 is actuated.

6. Desalting process

This process succeeds the ejection process (5). In this process, the raw water is supplied into the tank 1 to thereby wash out the residual salt water.

At the termination of the preceding ejection process (5), the limit switch L6 is connected with the contact $C10$ to actuate the timer T1 as stated above, and consequently this desalting process comes to start.

Figure 8A:
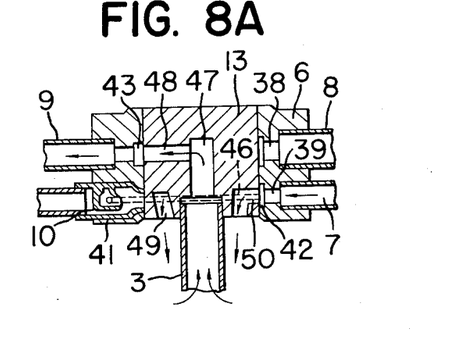
FIGS. 8A—C are views of a vertical section as well as cross sections of the same valve member as above, as taken at the time of the desalting process.
Figure 8B:
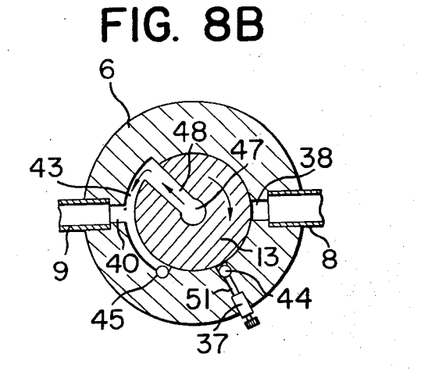
Figure 8C:
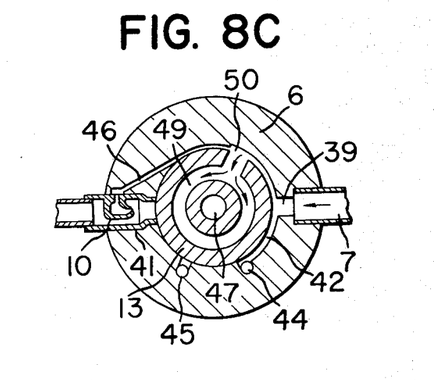

The position of the rotary valve 13 at this time is as illustrated in FIGS. 8A, B and C. That is, the raw water pipe 7 is connected with the inside of the tank 1 through the horizontal hole 39, arcuate groove 42, horizontal hole 50 and circular groove 49, and the inside of said tank 1 is further connected with the horizontal pipe 9 through the vertical hole 47, horizontal hole 48, vertical hole 44 and horizontal hole 40.

Accordingly, the raw water sent in from the raw water pipe 7 is supplied to the tank 1 through the arcuate groove 42 and circular groove 49, and the salt water remaining in the layer of resin 2 within said tank 1 is carried away by this raw water into the discharge pipe 9 through the water pipe 3 and is discharged to the outside of the tank 1, whereby the resin 2 is desalted.

When the foregoing desalting process has continued for the period of time set in the timer T1, said timer T1 works in the same way as in the preceding ejection process (5), so that the cam 20 parts from the limit switch L6 to restore the timer T1 to its former condition and thereafter pushes the limit switch L1 of the line 69 to close it, the relay R3 is excited, the switch r4 of the line 66 opens, the self-held relay R6 gets demagnetized, the switch r6 of the line 72 opens, and the motor 17 is stopped.

The above elucidated is a mode of automatic progress of the softening operation from the state of apparatus in abeyance (1) to the desalting process (6) in regular succession by the use of an apparatus embodying the present invention, yet it is also possible to apply different mode of proceedings in performing said softening operation. Given in the following are instances of such different modes.

7. Return to the state of apparatus in abeyance (1) from the softening process (2)

This is a work to be performed by hand or automatically for the purpose of returning the apparatus to the state of suspension in the course of the softening process (2). It goes as follows:

In order to suspend the softening process (2) by manual operation, it suffices to open the switch S1 of the line 70, And, when the water level in the tank 36 reaches to a predetermined level, the floating switch S5 opens and the apparatus in softening operation automatically returns to the state of abeyance.

To be precise, when the relay R3 geets demagnetized due to opening of the switch S1 or S5, the switch r3 of the lines 71 and 72 is connected with the contact c2, whereby the relays R1 and R2 are excited.

By virtue of excitation of these relays R1 and R2, the switch r1 of the line 73 is connected with the contact c12, and at the same time, the switch r2 of said line 73 closes, the motor 17 rotates in the reverse direction, the cam 20 turns anticlockwise in FIG. 9 to part from the limit switch L2 and pushes the limit switch L1 to close it.

At this, the relay R4 is excited and the contact r4 of the line 72 opens, while the relay R2 is demagnetized to open the contact r2 of the line 73, and the rotation of the motor 17 stops to return the apparatus to the state of abeyance (1).

8. Interlocking with the boiler

Referring to FIG. 10, R8 represents the relauy interlocked with a boiler switch not shown in the drawing. This relay R8 is supposed to be excited during the operation of the boiler, whereby the switch r8 of the line 67 is opened. Accordingly, during the operation of the boiler, the relay R8 is not excited even when the timer T2 attains a predetermined time, so that the operation of the apparatus does never automatically shift to the next washing process (3). On the other hand, when the operation of the boiler is suspended, the relay R8 gets demagnetized to close the switch r8, the relay R6 is excited, and the operation of the apparatus shifts automatically to the next washing process (3).

In other words, even when the softening capacity of the resin 2 within the tank 1 has reached the limit, the operation of the apparatus does never automatically shift to the following washing process, activation process and so on during the operation of the boiler; said shift will take place only when the operation of the boiler is suspended.

Although particular preferred embodiments of the present invention have been disclosed hereinabove for the purpose of illustration, it will be understood that variations and modifications thereof which lie within the scope of the invention as defined by the appended claims are fully contemplated.

What is claimed is:

1. An apparatus for softening hard water, comprising:
an upright tank having an upwardly directed opening in the upper end thereof;
a cylindrical sleevelike valve seat fixedly mounted on the upper end of said tank in surrounding relationship to said opening, said valve seat having an inner cylindrical surface defined about a substantially vertical axis;
said valve seat having said first and second ports formed therein and extending radially therethrough, said first and second ports being substantially diametrically opposed and located substantially within a first radial plane which extends perpendicular to the axis of said valve seat;
said valve seat also having third and fourth ports formed therein and extending radially therethrough, said third and fourth ports being substantially diametrically opposed and located substantially within a second radial plane which extends perpendicular to the axis of said valve seat, said second radial plane being axially spaced from said first radial plane;
a soft water pipe, a discharge pipe, a raw water pipe, and a saltwater pipe respectively connected to the outer ends of said first, second, third and fourth ports;
valve means rotatably fitted within valve seat for rotation about said vertical axis, said valve means including a substantially cylindrical valve member disposed within the valve seat and having an outer cylindrical surface disposed in slidable and sealed engagement with said inner cylindrical surface;
said valve member having first passage means extending therethrough, one end of said first passage means terminating in the lower axial end of said valve member for communication with the interior of said tank, and the other end of said first passage means terminating in a first radial opening which extends through said outer cyclindrical surface and is disposed substantially within said first radial plane;
a substantially vertically extending pipe disposed within the tank and having the upper end thereof connected to said valve member for communication with said one end of said first passage means, the lower end of said vertically extending pipe extending into a mass of ion exchange resin disposed within the tank;
said valve member having second passage means extending therethrough, one end of said second passage means terminating in the lower axial end of said valve member for communication with the interior of said tank, and the other end of said second passage means terminating in a second radial opening which extends through the outer cylindrical surface and is disposed substantially within said second radial plane;

ejector means associated with said fourth port for permitting saltwater to be sucked through said saltwater pipe and supplied into said tank;

said valve set having restricted flow passage means formed therein and connecting said third and fourth ports for permitting raw water to be supplied to said ejector means to actuate same;

motor means connected to said valve member for rotating same; and control means for selectively rotating said motor means and the associated valve member.

2. An apparatus according to claim 1, wherein said valve seat has a first elongated slot formed in said inner surface and extending circumferentially of said inner surface through a substantial angular extent, said first slot communicating with said third port, said valve seat having a second elongated slot formed in said inner surface and extending circumferentially thereof through a substantial angular extent, said second slot communicating with said second port, said first and second ports being respectively positioned substantially directly above said third and fourth ports, a first interior passage formed in said valve seat and extending axially thereof between said first and second radial planes, said first interior passage providing communication between said first slot and a fifth port which is formed in said inner cylindrical surface substantially within said first radial plane, said fifth port being angularly spaced from said first port, said valve member also having a second intermediate passage formed therein and extending radially between said first and second radial planes, said second intermediate passage communicating at one end with said second slot and terminating at its other end in a sixth port which is formed in said inner cylindrical surface, said sixth port being substantially within said second radial plane and angularly spaced from said fourth port.

3. An apparatus according to claim 2, wherein said one end of said second passage means terminates in an annular passageway which is formed in said valve member adjacent the lower axial end thereof and opens outwardly through the lower axial end of said valve member in surrounding relationship to the vertically extending pipe.

4. An apparatus according to claim 1, wherein the motor means is fixedly mounted to said tank and is positioned directly above and substantially coaxially aligned with said valve member, said motor means having shaft means coaxially aligned with and drivingly connected between said motor means and said valve member for rotating same, and said control means including a cam disposed between said valve member and said motor means and fixedly connected to said shaft means for rotation therewith, the control means also including a plurality of limit switches disposed within a circular pattern and positioned in surrounding relationship to said cam so as to be activated by said cam upon rotation thereof.

5. An apparatus according to claim 4, wherein said control means includes:

first means for rotating the valve member into a first position wherein said third port communicates with said second passage means to supply raw water into the tank and the first passage means communicates with said first port for permitting softened water to be discharged through said soft water pipe;

second means for rotating said valve member to a second position wherein said first passage means communicates with said first intermediate passageway so that raw water is supplied through said raw water pipe to said third port and through said first intermediate passageway and said first passage means into said vertical pipe, and wherein said second port communicates through said second intermediate passageway with said second passage means to permit the raw water in said tank after cleaning of said resin to be discharged into said discharge pipe;

third means for rotating said valve member to a third position wherein said second passage means communicates with said fourth port so that said ejector means is activated by the raw water flowing through said restricted flow passage means to thereby suck saltwater through the saltwater pipe and discharge same into the tank, and wherein the first passage means communicates with said second port for permitting discharge of water from the tank; and fourth means for rotating said valve member into a fourth position wherein said second passage means communicates with said third port to permit raw water to be supplied into the tank, and wherein said first passage means communicates with said second port to permit the saltwater in the tank to be discharged through the vertically extending pipe into the discharge pipe.

6. An apparatus according to claim 5, wherein said valve member includes first and second intermedite passageways formed therein and extending between said first and second radial planes, said first passageway communicating at one end thereof with said third port and communicating at the other end thereof with a fifth port which is formed in said inner cylindrical surface within said first radial plane and is angularly spaced from said first and second port, and wherein said second intermediate passageway communicates at one end thereof with said second port and terminates at the other end thereof in a sixth port which is formed in said inner cylindrical surface substantially within said second radial plane and is angularly spaced from said third and fourth ports.

* * * * *

UNITED STATES PATENT AND TRADEMARK OFFICE
CERTIFICATE OF CORRECTION

PATENT NO. : 3 962 089
DATED : June 8, 1976
INVENTOR(S) : Yoshisada Fulukawa

It is certified that error appears in the above-identified patent and that said Letters Patent are hereby corrected as shown below:

Column 11, line 11; change "said valve set" to ---said valve seat---.

Column 11, line 38; change "radially" to ---axially---.

Column 12, line 6; change "Claim 4" to ---Claim 1---.

Column 12, line 46; change "intermedite" to ---intermediate---.

Signed and Sealed this

Seventh Day of September 1976

[SEAL]

Attest:

RUTH C. MASON
*Attesting Officer*

C. MARSHALL DANN
*Commissioner of Patents and Trademarks*